(12) United States Patent
Li (10) Patent No.: US 10,523,009 B2
(45) Date of Patent: Dec. 31, 2019

(54) METHOD AND APPARATUS FOR GENERATING MULTI-PHASE AC POWER FROM DC POWER SOURCE

(71) Applicant: Shaolin Li, Fremont, CA (US)

(72) Inventor: Shaolin Li, Fremont, CA (US)

( * ) Notice: Subject to any disclaimer, the term of this patent is extended or adjusted under 35 U.S.C. 154(b) by 428 days.

(21) Appl. No.: 15/341,919

(22) Filed: Nov. 2, 2016

(65) Prior Publication Data

US 2017/0163041 A1 Jun. 8, 2017

Related U.S. Application Data

(60) Provisional application No. 62/285,486, filed on Nov. 2, 2015.

(51) Int. Cl.
*H02J 3/38* (2006.01)
*H02M 7/493* (2007.01)
*H02M 1/00* (2006.01)

(52) U.S. Cl.
CPC ............ *H02J 3/383* (2013.01); *H02M 7/493* (2013.01); *H02M 2001/0093* (2013.01); *Y02E 10/563* (2013.01)

(58) Field of Classification Search
None
See application file for complete search history.

(56) References Cited

U.S. PATENT DOCUMENTS

2012/0250369 A1* 10/2012 Furukawa ......... H02M 3/33584
363/25
2012/0281444 A1* 11/2012 Dent ................. H02M 7/53871
363/56.01

\* cited by examiner

*Primary Examiner* — Thienvu V Tran
*Assistant Examiner* — David M Stables
(74) *Attorney, Agent, or Firm* — JW Law Group; James M. Wu (57) ABSTRACT

A DC/AC power converter ("DPC") capable of generating multi-phase power supply is disclosed. DPC, in one embodiment, includes a first switching bridge, second switching bridge, patch component, first phase generator, and second phase generator. The first switching bridge is coupled to a DC bus and configured to extract a first portion of the DC bus in accordance with a first phase of DC waveform. The second switching bridge, in one aspect, extracts a second portion of the DC bus in accordance with a second phase of DC waveform. The patch component is capable of generating a first patch waveform in response to a third portion of the DC bus. The first phase generator is configured to generate a first phase AC waveform based on the first portion of the DC bus and a first patch waveform.

17 Claims, 9 Drawing Sheets

METHOD AND APPARATUS FOR GENERATING MULTI-PHASE AC POWER FROM DC POWER SOURCE

PRIORITY

This application claims the benefit of priority based upon U.S. Provisional Patent Application having an application Ser. No. 62/285,486 filed on Nov. 2, 2015, and entitled "Method and Apparatus for harvesting PV energy from DC to 2 phase AC with energy storage," which is hereby incorporated herein by reference in its entirety.

FIELD

The exemplary embodiment(s) of the present invention relates to the field of energy generation. More specifically, the exemplary embodiment(s) of the present invention relates to converting solar energy.

BACKGROUND

With increasing demand in green energy such as solar panels and wind turbines, demand in efficient energy conversion from DC to AC also increase. Green energy such as solar energy is typically direct current ("DC") power and requires DC to AC (alternating current) conversion before the power can be used or pumped back to connected power grid. To properly handle the DC to AC ("DC/AC") conversion, a power inverter or inverter is usually employed. A conventional DC/AC power inverter may include various electronic power components configured to change or convert DC to AC in a photovoltaic ("PV") system.

A problem associated with the conventional DC/AC inverter, however, is that it requires double-stage conversion. For example, the conventional DC/AC inverter typically converts DC to DC in stage I conversion and then DC to AC in stage II conversion. Each stage, however, usually consumes energy whereby double-stage conversion can negatively affects overall PV system efficiency.

Another problem associated with a convention DC/AC inverter using single DC/AC stage conversion is that it typically requires double capacity of system power in view of rated power output.

Another drawback associated with a convention DC/AC inverter is that it requires a sizable capacitor array for DC/AC power conversion. A characteristic of a capacitance device is that it not only consumes power, but also has a limited lifespan.

SUMMARY

One embodiment of the present invention discloses a DC-to-AC or DC/AC power converter ("DPC") capable of generating multi-phase pseudo or AC power supply. DPC, in one embodiment, includes a first switching bridge, second switching bridge, patch component, first phase generator, and second phase generator. The first switching bridge is coupled to a DC bus and configured to extract a first portion of direct current ("DC") from the DC bus in accordance with a first phase of DC waveform. The second switching bridge, in one aspect, extracts a second portion of DC from the DC bus in accordance with a second phase of DC waveform. The patch component is capable of generating a first patch waveform and a second patch waveform in response to a portion of DC from the DC bus. The first phase generator is configured to generate a first phase AC waveform or first phase pseudo-AC waveform based on the first portion of DC and a first patch waveform. The second phase generator is able to generate a second phase AC waveform based on the second portion of DC and a first patch waveform.

Additional features and benefits of the exemplary embodiment(s) of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiments of the present invention are described herein in the context of a methods, system and apparatus of converting DC to AC using a patch component.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

In accordance with the embodiment(s) of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like), phase change memory ("PCM") and other known types of program memory.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof.

The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

One embodiment of the present invention discloses a DC-to-AC power converter ("DPC") capable of generating multi-phase power supply. In one aspect, DPC obtains DC generated by Photovoltaics ("PV") energy such as solar panels and converts DC to alternative current ("AC") efficiently. For example, DPC provides an energy harvest scheme using DC/AC inverter in a PV system.

DPC, in one embodiment, includes a first switching bridge, second switching bridge, patch component, first phase generator, and second phase generator. The first switching bridge is coupled to a DC bus and configured to extract a first portion of direct current ("DC") from the DC bus in accordance with a first phase of DC waveform. The second switching bridge, in one aspect, extracts a second portion of DC from the DC bus in accordance with a second phase of DC waveform. The patch component is capable of generating a first patch waveform and a second patch waveform in response to a portion of DC from the DC bus. The first phase generator is configured to generate a first phase AC waveform based on the first portion of DC and a first patch waveform. The second phase generator is able to generate a second phase AC waveform based on the second portion of DC and a first patch waveform.

Figure 1:
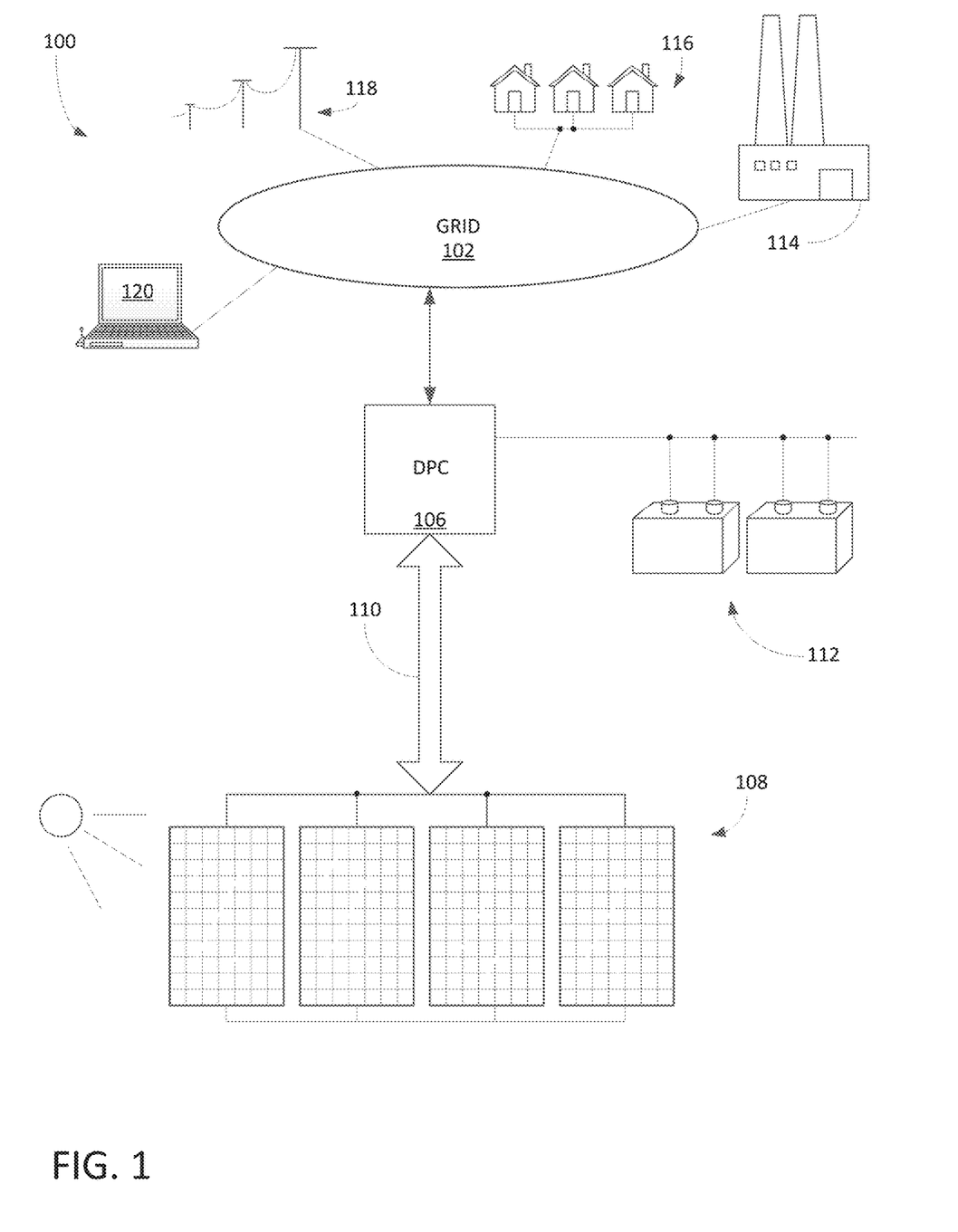
FIG. 1 is a block diagram illustrating a power distribution layout configured to convert DC power to AC power using DC/AC power converter ("DPC") in accordance with one embodiment of the present invention.

FIG. 1 is a block diagram 100 illustrating a power distribution layout configured to convert DC power to AC power using DPC in accordance with one embodiment of the present invention. Diagram 100 includes an array of solar panels 108, electric power grid 102, and DPC 106, wherein DPC 106 is further coupled to a cluster of batteries 112 for power storage. Batteries 112, in one example, are bidirectional DC/AC power storage capable of storing DC and/or AC power. It should be noted that the underlying concept of the exemplary embodiment(s) of the present invention would not change if one or more blocks (or devices) were added to or removed from diagram 100.

Solar panel 108 includes one or more solar photovoltaic panels wherein each panel contains multiple solar cells capable of converting photons into electricity. The electricity generated by solar panel 108 is generally DC power. Solar panels 108, in one example, are organized or interconnected in a parallel to boost power output. Alternatively, solar panels 108 can also be arranged or interconnected in a serial configuration. Depending on the applications, solar panels 108 can be either connected in serial or parallel for different power specifications and/or requirements. Upon generating DC power, the output is transmitted from solar panels 108 to DPC 106 via a DC bus 110.

DPC 106, in one embodiment, includes multiple switching bridges, phase generators, patch component(s), memory, and microcontroller. A function of DPC 106 is to parse and reshape DC waveforms into pseudo or AC like multi-phase AC waveform. To provide multi-phase AC output, DPC 106, in one embodiment, is able to generate patch waveform and invert a portion of DC waveforms to generate multi-phase AC output. The multi-phase AC output can also be used to recharge batteries 112 for power storage as well as pump the AC output back to electrical power grid 102.

Electrical power grid or electrical grid 102 is a power network used for delivering electricity efficiently between source and destination. For example, grid 102 includes power station 114, end users 116, transmission lines 118, and the like. In one embodiment, power management 120 can also attached to grid 102 for managing power delivery from DPC 106 to grid 102. Power station 114, for instance, generates electrical power. High-voltage transmission lines 118 are configured to carry or transmit power from source location(s) to destination location(s) such as individual end users 116.

Power management 120, in one embodiment, is a power management module which can be hardware, software, or combination of hardware and software. A function of power management 120 is to allow an administrator to manage and/or monitor various DPCs connected to grid 102. For example, the administrator can remotely manage attached DPCs 106 to generate different types of power outputs, such as two-phase AC output, three-phase AC output, high voltage, high current, and the like.

The multi-phase AC output generated by DPC 106 can be single-phase electric power, two-phase electric power, or three-phase electrical power depending on the applications. Single-phase electric power, for example, distributes AC electric power, and two-phase electrical power generates AC electric power with voltage phases differing by one-quarter of a cycle, such as 90° between two (2) voltage phases. Three-phase electric power is AC electric power which is a common method for transferring power and/or driving heavy loads.

An advantage of employing DPC 106 is that it converts DC waveform to pseudo AC waveform or AC waveform with minimal power loss. Another advantage of using DPC 106 is that it does not require capacitance devices for temporarily power storage whereby it enhances conversion efficiency as well as device lifespan.

Figure 2:
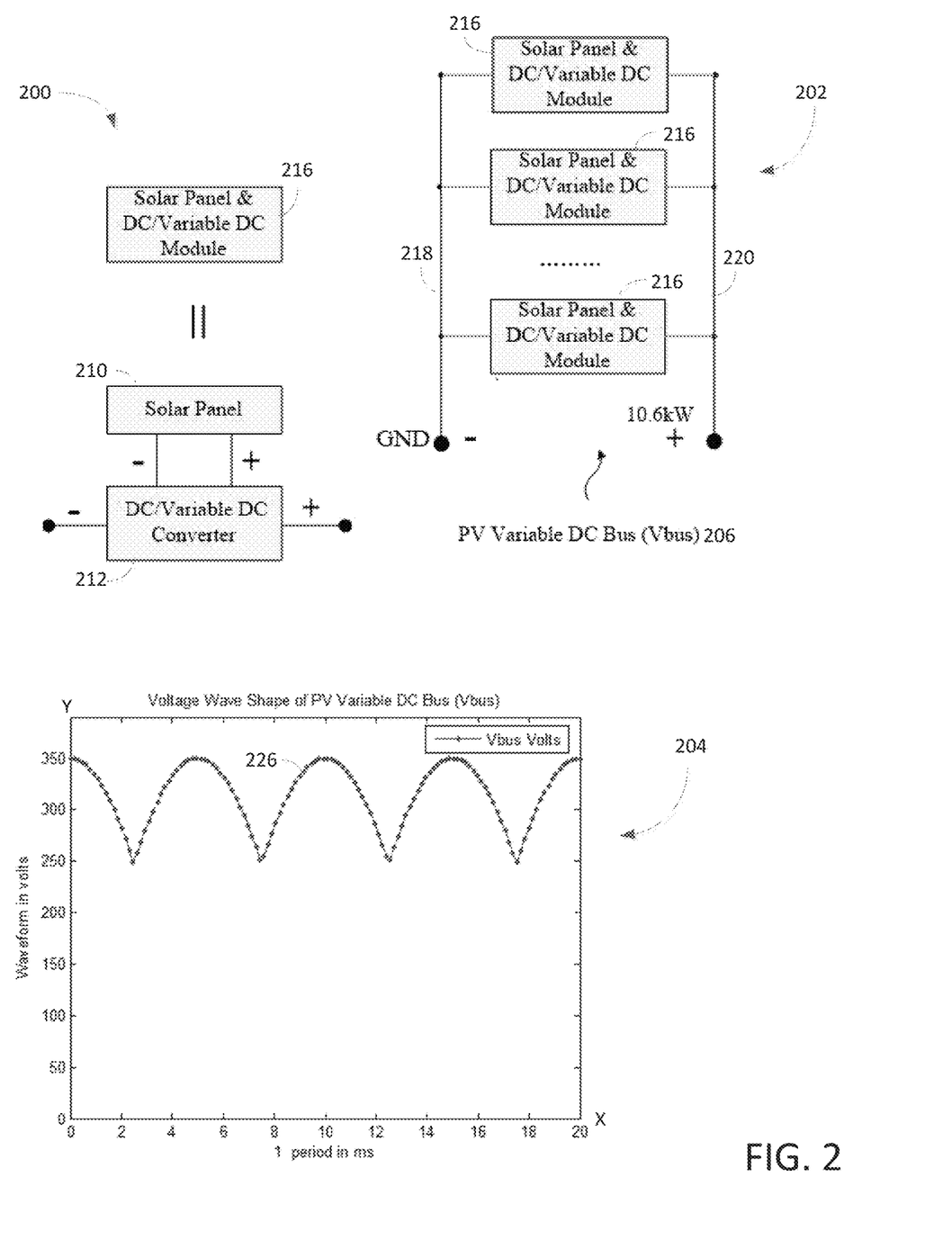
FIG. 2 is a block diagram illustrating a cluster of solar panel and DC variable DC converter ("SVC") capable of generating DC output in accordance with one embodiment of the present invention.

FIG. 2 is a block diagram 200 illustrating a cluster of solar panel and DC variable DC converter ("SVC") 216 capable of generating DC output via a PV variable DC bus ("Vbus") 206 in accordance with one embodiment of the present invention. SVC 216, in one aspect, includes a solar panel 210 and a DC variable DC ("DVD") convert 212. DVD convert 212, in one embodiment, includes memory and controller configured to generate pseudo-DC output as indicated in waveform 204. It should be noted that the underlying concept of the exemplary embodiment(s) of the present invention would not change if one or more blocks (or devices) were added to or removed from diagram 200.

Solar panel 210, which is similar to panel 108 shown in FIG. 1, includes multiple solar PV cells capable of converting sun light into electricity. The electricity generated by solar panel 210 is DC output. To generate DC output from a multiple solar panels such as panel 210, a DVD converter, also known as DC-to-DC ("DC/DC") converter, is used or attached to each solar panel 210 to reduce output interference between solar panels. A solar panel attached with a DC/DC converter becomes an individual DC module whereby multiple DC modules can be connected either in serials or parallel to enhance power output. DC is one directional flow of electric charge. DC can be generated via certain energy generator(s), such as, solar cells, batteries, power supplies, thermocouples, and the like. The flow of electric charge or DC flows in a conductive wire or cable. Note that the electric current usually flows in a constant direction DVD converter 212 is configured to generate a pseudo-DC voltage waveform as illustrated in waveform diagram 204. DVD converter 212, also known as solar inverter, or PV inverter, converts variable DC output from solar panel 210 into a pseudo-DC having a voltage waveform 226 in waveform 204. For example, voltage waveform 226 is an elevated half sign wave with a peak around 350 volts ("Vt") while a bottom around 250 Vt. To generate waveform 226, DVD converter 212, in one aspect, employs a pulse-width modulation ("PWM") or pulse-duration modulation ("PDM") to produce an elevated half sing wave by, for example, turning switch(es) between supply and load on and off at a fast rate.

Multiple SVCs 216, in one embodiment, are connected in parallel via connections 218-220 as indicated by numeral 202. Connections 218-220 forms Vbus 206 wherein one terminal, for example, is ground ("GND") and another terminal has a voltage of 10.5 kilowatts ("kW"). In an alternative embodiment, multiple SVCs 216 are connected in serial to increase voltage. Depending on the applications, SVCs 216 can either be interconnected in parallel or in serial. For example, PV energy is generated by SVCs 216 connected in parallel and Vbus 206 carries PV energy as voltage outputs.

Figure 3:
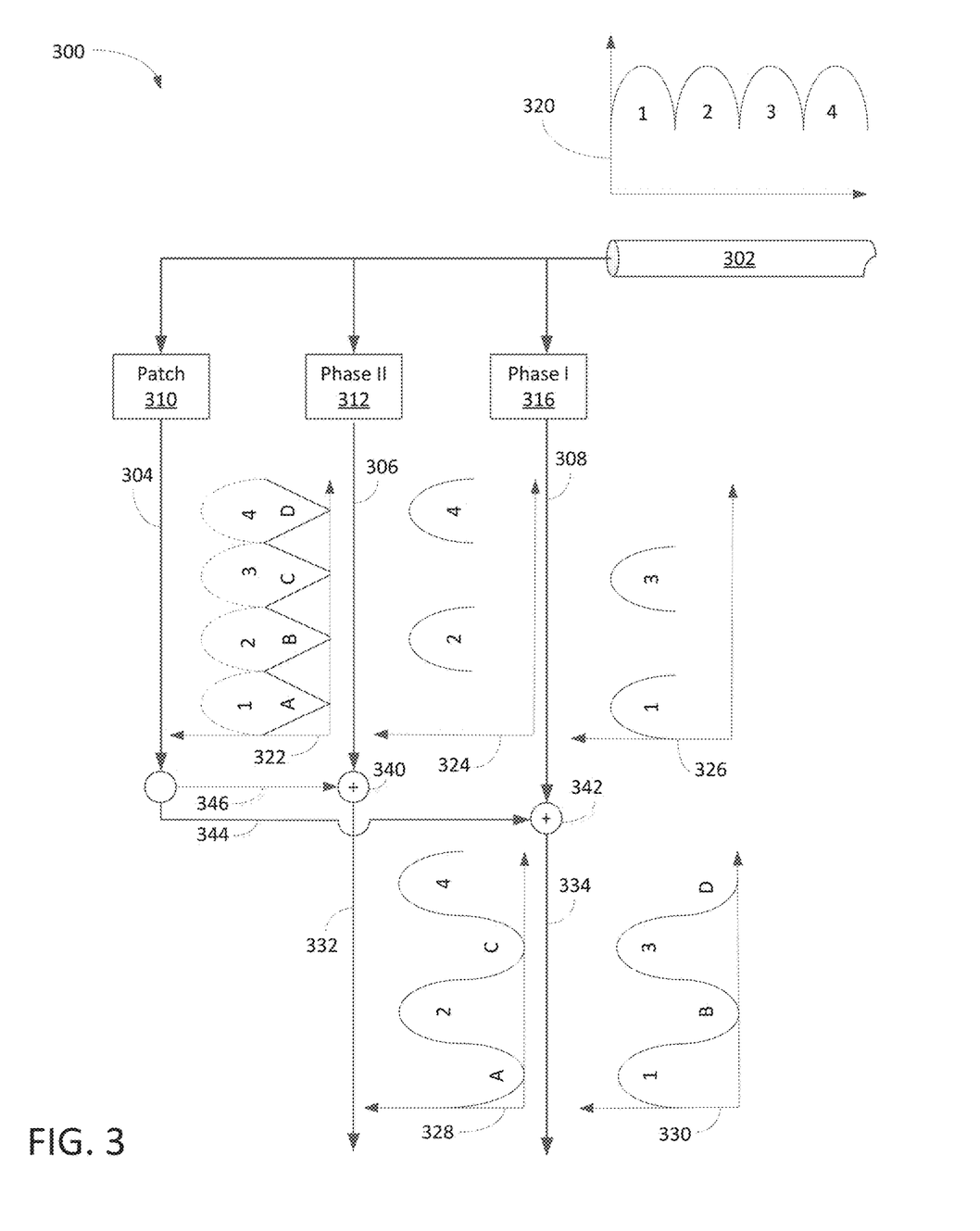
FIG. 3 is a logic diagram illustrating a DPC process of converting DC to AC using a patch component in accordance with one embodiment of the present invention.

FIG. 3 is a logic diagram 300 illustrating a DPC process of converting DC to AC using a patch component in accordance with one embodiment of the present invention. Upon receipt of a DC output 302 having a waveform 320, a phase I component 316 extracts phase one portion of waveform as illustrated in waveform 326 from waveform 320. Phase II component 312 extracts phase two portion of waveform as illustrated in waveform 324. Note that waveform 326 includes half sing waves 1 and 3 of waveform 320 while waveform 324 includes half sing waves 2 and 4 of waveform 320. Patch component 310 generates bottom portion or missing portion of patch waveform 322 based on DC output or waveform 302.

A portion of patch waveform 322 such as wave B and D flows from connection 304, 344 to a phase I generator 342 to perform a merger function between patch waves B, D and half sing waveform 326. After merging, a portion of the merged waves are flipped to generate phase I waveform 330 at output connection 334. Similarly, a portion of patch waveform 322 such as wave A and C flows from connection 304, 346 to phase II generator 340 to merge wave A and C with half sing waveform 324. After merging, a portion of the merged waves are flipped to generate phase II waveform 328 at output connection 332.

An advantage of employing DPC process is that the process is able to generate a pseudo multi-phase AC waveform without using capacitance device(s).

Figure 4:
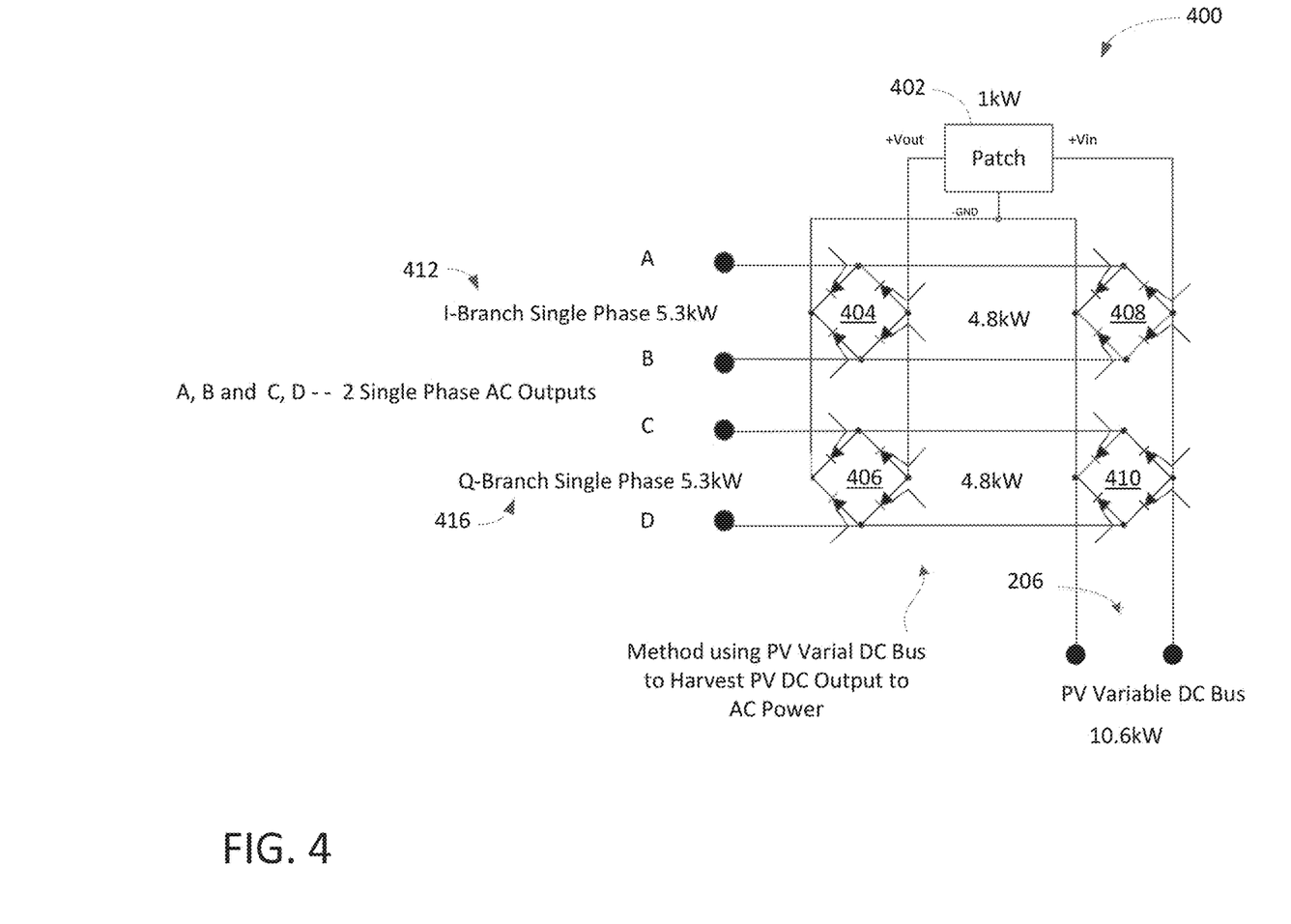
FIG. 4 is a block diagram illustrating a DPC configured to convert DC to multi-phase AC waveform in accordance with one embodiment of the present invention.

FIG. 4 is a block diagram illustrating a DPC 400 configured to convert DC to multi-phase AC waveform in accordance with one embodiment of the present invention. DPC 400 includes a first switching bridge 410, second switching bridge 408, first phase generator 406, second phase generator 404, and patch component 402. First and second switching bridges 408-410 are coupled to Vbus 206. It should be noted that the underlying concept of the exemplary embodiment(s) of the present invention would not change if one or more blocks (or devices) were added to or removed from diagram 400.

Upon receiving DC output from DC bus or Vbus 206, first switching bridge 410, in one embodiment, extracts a first portion of DC output from the DC bus in accordance with a first phase of DC waveform. First switching bridge 410 includes a diode bridge and a first waveform controller. A function of first switching bridge 410 is that it is able to identify and separate a relevant portion of DC output carried by Vbus 206 based on a predefined wave shape.

Second switching bridge 408 which is coupled to Vbus 206 and is configured to extract a second portion of DC output from DC bus or Vbus 206 in accordance with a second phase of DC waveform. Second switching bridge 408 includes a diode bridge and a second waveform controller. The controller, in one example, is used to adjust phase I output wave shape. Also, the controller is able to communicate with an administrator via a grid. A function of second switching bridge 408 is that it identifies and separates a relevant portion of DC output carried by Vbus 206 based on a predefined wave shape. In one embodiment, first and second switching bridges 408-410 include four (4) diodes forming a bridge for performing switching functions.

Patch component 402, in one aspect, is coupled to first switching bridge 410 and is configured to generate a first patch waveform in response to the DC output carried by the DC bus or Vbus 206. Patch component 402 can also generate a second patch waveform in response to the DC output for the missing part of second wave form. A function of patch waves is to extend bottom of DC output waveform from 250 Vt to around 0 Vt.

First phase generator 406 which is coupled to first switching bridge 410 is configured to generate a first phase AC waveform based on the output of first switching bridge 410 and first patch waveform. First phase generator 406 includes a four-diode bridge circuit and first phase controller. A function of first phase generator 406 is that it combines output of first switching bridge 410 with first patch waveform and subsequently inverts every other half sing wave to generate a Q-branch single phase AC output 416.

Second phase generator 404 which is coupled to second switching bridge 408 is configured to generate a second phase AC waveform based on the output of second switching bridge 408 and second patch waveform from patch component 402. Second phase generator 404 includes a four-diode bridge circuit and second phase controller. A function second phase generator 404 is that it combines output of second switching bridge 408 with second patch waveform and subsequently inverts every other half sing wave to generate an I-branch single phase AC output 412.

In one embodiment, PV system further includes solar panels connected in parallel wherein the solar panels couple to the DC bus for providing a unidirectional flow of electric charge or DC output. Alternatively, solar panels can be connected in serial wherein the panels are configured to couple to the DC bus for providing a unidirectional flow of electric charge. In one embodiment, DPC is further coupled to a transformer such as a Scott-T transformer, also known as Scott connection, to generate a third phase AC waveform in accordance with the first phase AC waveform and the second phase AC waveform. The PV system can further include a battery or batteries coupled to output of the transformer for storing power from the transformer.

For an exemplary operation, DC output from Vbus 206 has about 10.6 kW wherein the 10.6 kW are split into three branches wherein one branch carrying 1 kW goes to patch component 402 while the other two branches carrying 4.8 kW each to first and second switching bridges 408-410. After combining the patch waveform generated by patch component 402, I-branch 412 generates 5.3 kW while Q-branch 416 generates 5.3 kW.

An advantage of using DPC is that it provides two or more phase power from DC power source carried by Vbus 206 without using capacitor or capacitance device whereby enhances overall energy output.

Figure 5:
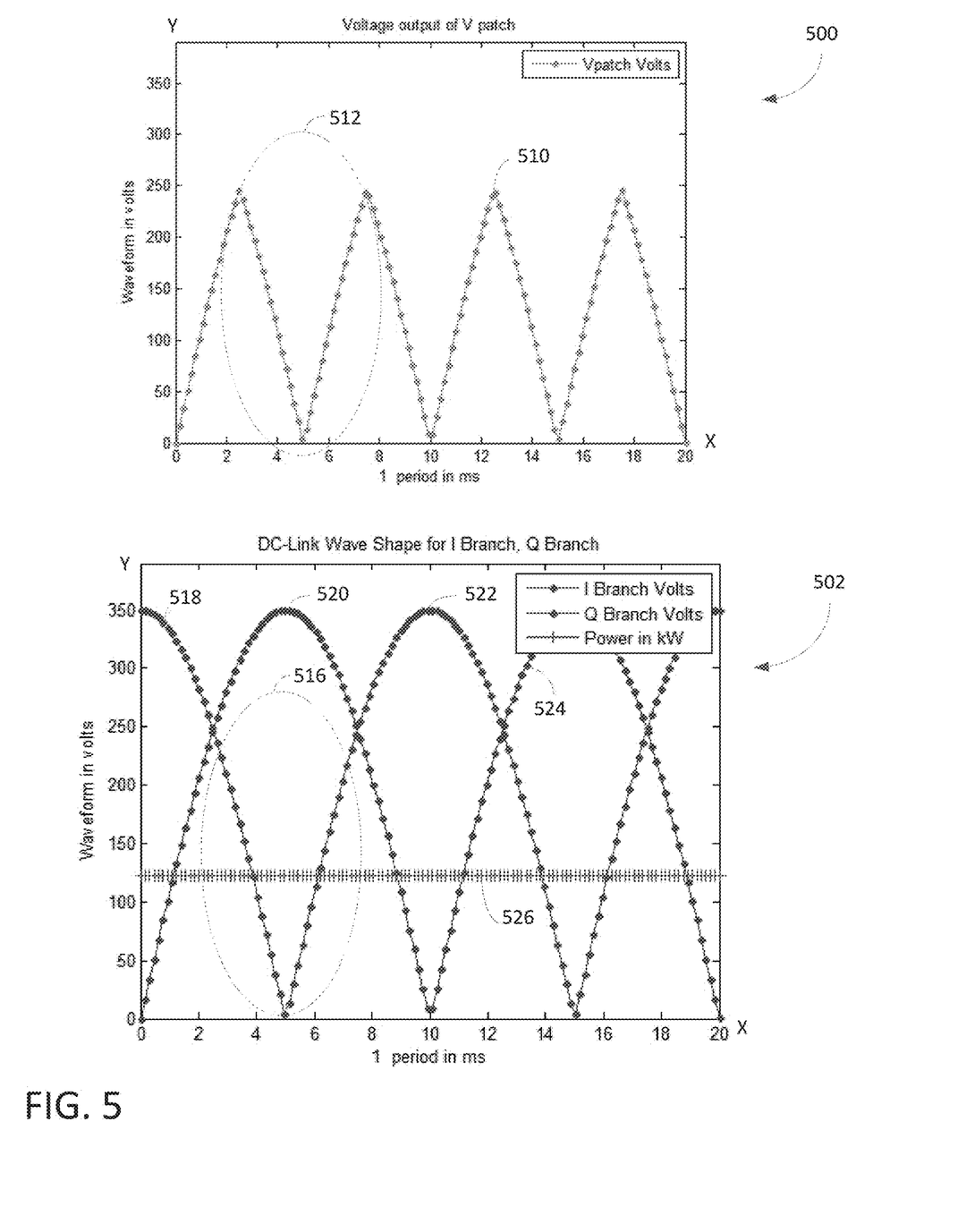
FIG. 5 illustrates voltage waveform diagrams generated by DPC in accordance with one embodiment of the present invention.

FIG. 5 illustrates voltage waveform or waveform diagrams 500-502 generated by DPC in accordance with one embodiment of the present invention. Waveform diagram 500 illustrates an exemplary patch waveform 510 or voltage output of voltage patch generated by patch component 302 shown in FIG. 4. While the peak of patch waveform 500, in this example, reaches 250 Vt, the bottom of patch waveform 500 is around 0 Vt. In one aspect, patch waveform 510 is used to append to voltage waveform 226 shown in FIG. 2 to extend voltage waveform 226 from approximately 250 Vt to around 0 Vt.

Waveform diagram 502 illustrates exemplary DC-link wave shapes for both I branch and Q branch. In one aspect, waveform 502 is a waveform of combination of waveform 226 and patch waveform 510 to generate two half sing waves 518-520 extending from 0 Vt at the bottom to 350 Vt at the peak. For example, wave portion 512 shown in waveform 500 is the same or similar to wave portion 516 of waveform 518.

Half sing wave 518 which starts from 0 Vt at the bottom to 350 Vt at the peak is configured to be the output of Q branch. Half sing wave 520 which also starts from 0 Vt at bottom to 350 Vt at the peak is the output of I branch. The average voltage of waves 518-520, in one example, should be around 120 Vt as indicated by numeral 526. In one embodiment, DPC is configured to flip every other half sing waves in waves 518-520 to generate a two-phase AC output. For example, if half sing wave 522 or 524 is flipped along X-axis, a single phase sing wave or AC output is produced as illustrated in FIG. 6.

Figure 6:
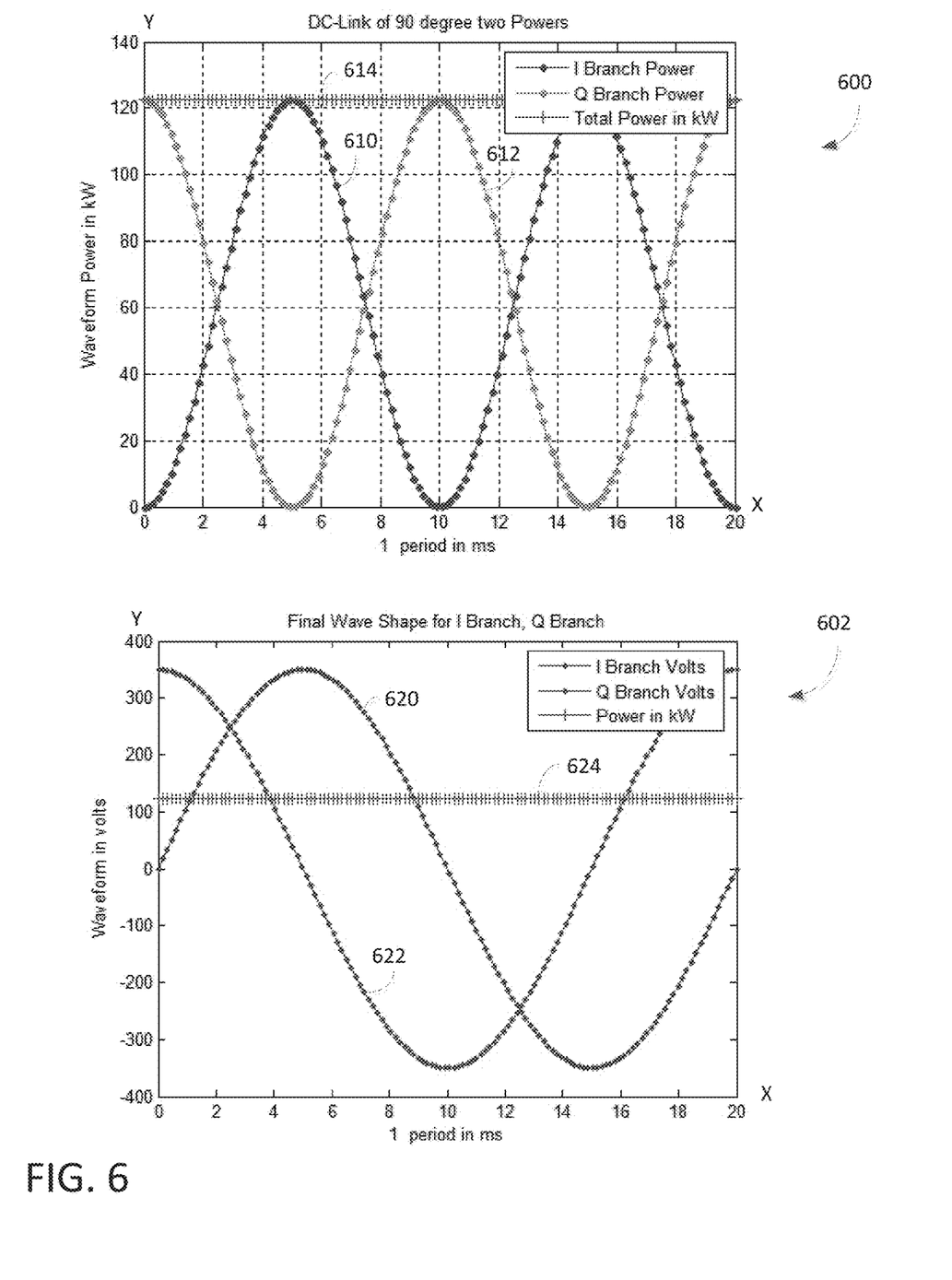
FIG. 6 illustrates voltage waveform diagrams generated by DPC in accordance with one embodiment of the present invention.

FIG. 6 illustrates voltage waveform diagrams 600-602 generated by DPC in accordance with one embodiment of the present invention. Waveform diagram 600 illustrates DC-link 90 degree two-phase AC power which is created after flipping portions of half sing waves 518-520 as shown in FIG. 5. Waveform 610, in one aspect, is a single phase AC output for I branch power while waveform 612 is another single phase AC output for Q branch power. While the peak of waveform 600, in this example, reaches 120 Vt, the bottom of waveform 600 is around 0 Vt. In one example, peak-to-peak power for waveforms 610-612 is about 120 Vt as indicated by numeral 614.

Waveform 602 illustrates final wave shapes of I branch and Q branch outputs or 2-phase power outputs wherein the output power should be around 120 Vt as indicated by numeral 624. The root mean square ("RMS") of peak voltage for AC power outputs, for example, can be set to any level other than the values in addition to the values shown in FIG. 6. The resulting 2-phase AC power, in one example, should be in a range of frequency between 50 to 60 Hz (hertz). Note that the power or wattage value in FIG. 6 is for illustration purposes and they can be other values or factors.

Figure 7:
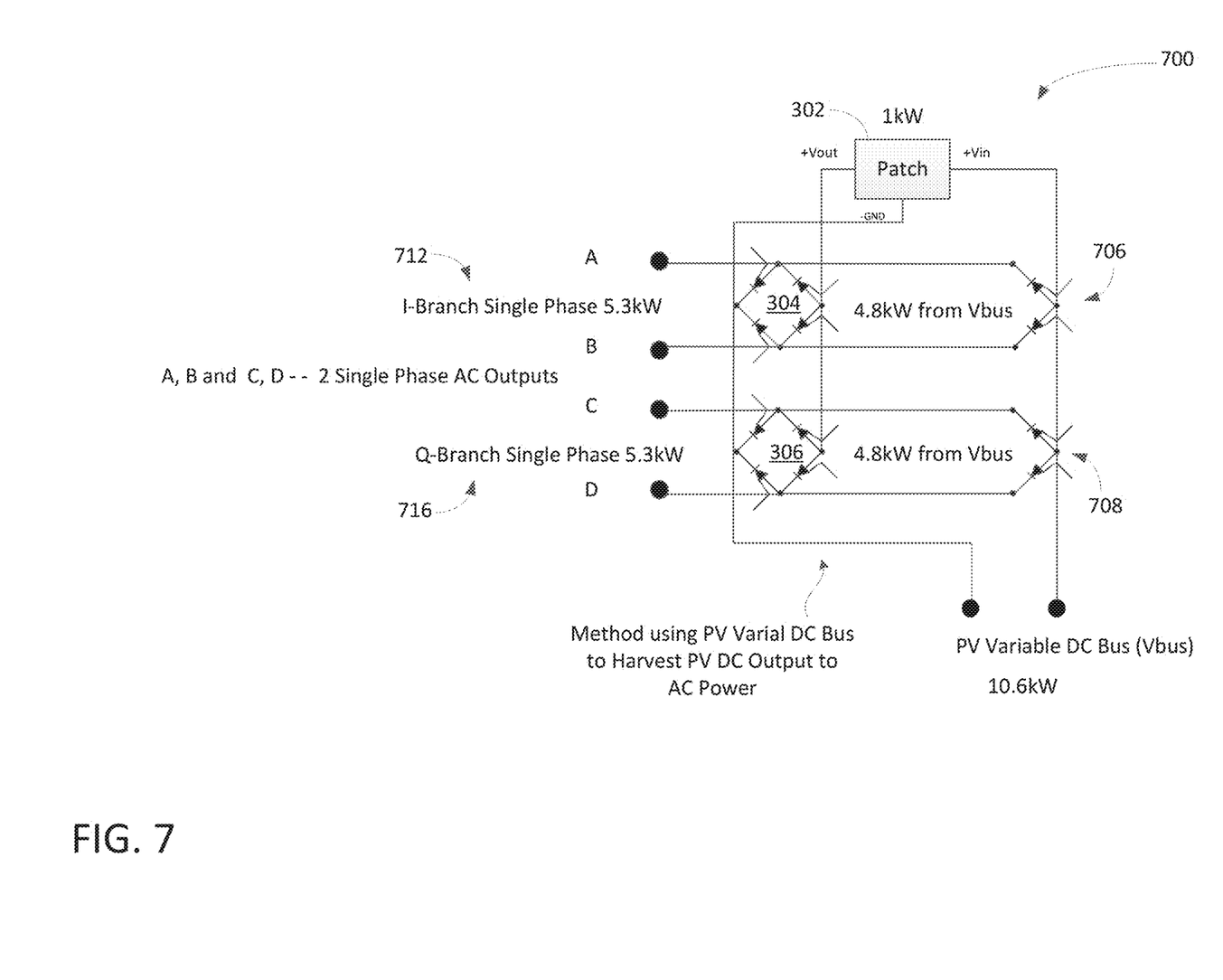
FIG. 7 is a block diagram illustrating an alternative embodiment of DPC capable of converting DC to AC in accordance with one embodiment of the present invention.

FIG. 7 is a block diagram illustrating an alternative embodiment of DPC 700 capable of converting DC to AC in accordance with one embodiment of the present invention. DPC 700 is similar to DPC 400 shown in FIG. 4 except that DPC 700 uses different switching bridges 706-708 than DPC 400. Upon receiving DC output from DC bus or Vbus 206, first switching bridge 708, in one embodiment, extracts a first portion of DC output from the DC bus in accordance with a first phase of DC waveform. First switching bridge 708 includes a diode bridge containing two diodes and a controller. A function of first switching bridge 708 is that it is able to identify relevant portion of DC output and subsequently separate the relevant portion of DC output from the DC output based on a predefined wave shape.

Second switching bridge 706, coupled to Vbus 206, is configured to extract a second portion of DC output from DC bus or Vbus 206 in accordance with a second phase of DC waveform. Second switching bridge 706 includes a diode bridge containing at least two diodes and a controller. The controller, in one example, is used to adjust phase I output wave shape. A function of second switching bridge 706 is that it is able to identify relevant portion of DC output and configured to separate the relevant portion of DC output transmitted via Vbus 206 based on a predefined wave shape.

DPC 700, like DPC 400, is able to generated I-branch power output 712 and Q-branch power output 716 using two phase generators 304-306. Depending on the applications, either DPC 700 or DPC 400 may be used. It should be noted that the underlying concept of the exemplary embodiment(s) of the present invention would not change if one or more blocks (or devices) were added to or removed from DPC 700.

Figure 8:
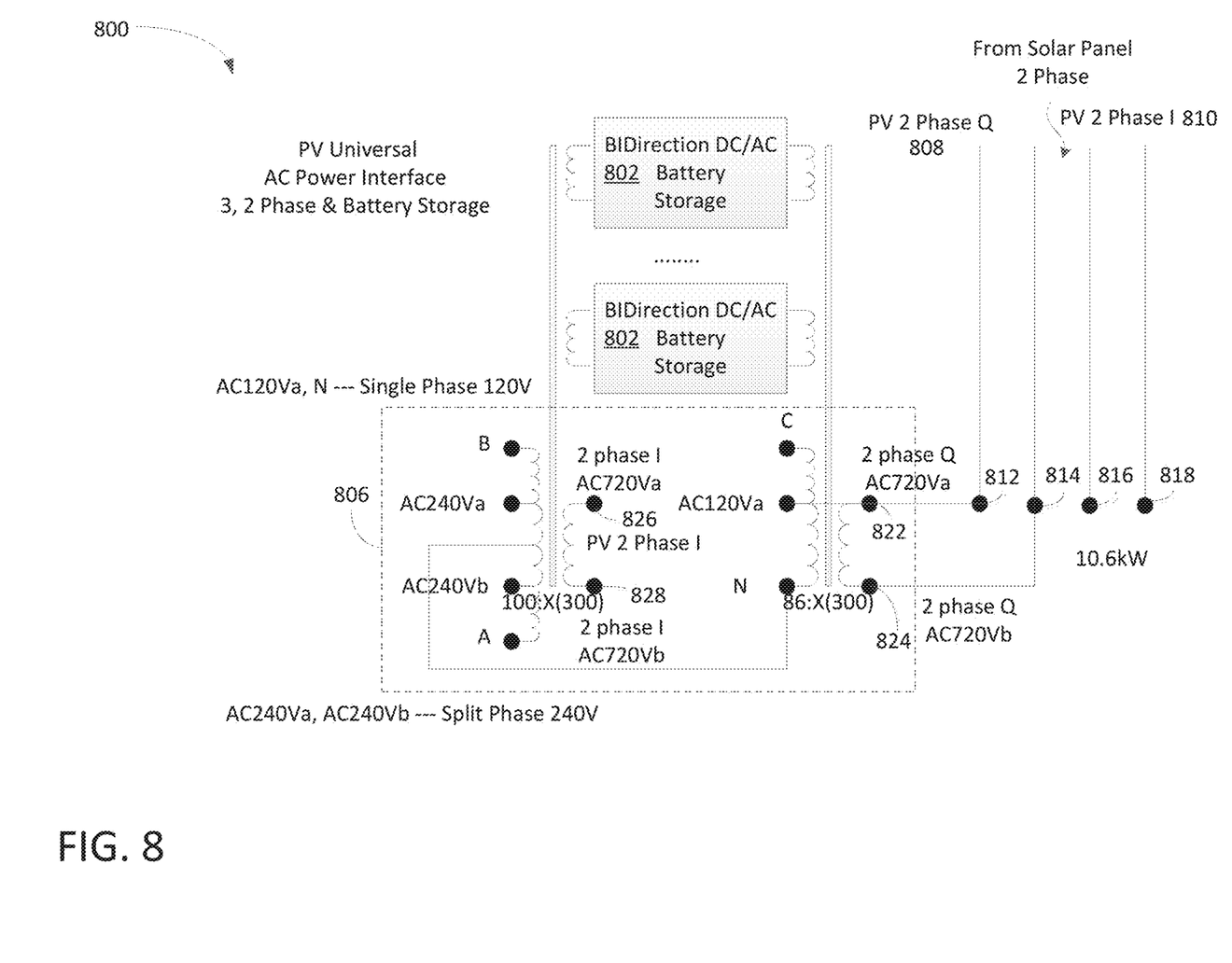
FIG. 8 is a block diagram illustrating a photovoltaic ("PV") system containing DPC and a transformer capable of generating a three-phase AC waveform in accordance with one embodiment of the present invention.

FIG. 8 is a block diagram illustrating a PV system 800 containing DPC and a transformer capable of generating a three-phase AC waveform in accordance with one embodiment of the present invention. PV system 800 includes a transformer 806, PV 2-phase Q-branch AC output 808, PV 2-phase I-branch AC output 810, and battery array 802. AC outputs 808-810, in one embodiment, are generated by DPC, not shown in FIG. 8. It should be noted that the underlying concept of the exemplary embodiment(s) of the present invention would not change if one or more blocks (or devices) were added to or removed from PV system 800.

Transformer 806 which can be a Scott-T transformer is capable of generating a 3-phase AC power output based on a 2-phase I and Q AC power. PV system 800 utilizes power from a 2-phase system to generate and deliver PV energy to single or three phase power grid or self-maintained microgrid. For example, Scott Transformer may be used to transfer 2-phase AC power to 3-phase AC power.

In one aspect, multiple Bi-Directional DC/AC storage devices 802 with at least one battery are used in the DC/AC Battery Storage. Note that device 802 may be scalable in light of battery storage block. PV system 800 enables the energy transfer between 2 phases and 3 phases. For example, PV system 800 can convert 2-phase AC power to 3-phase AC power or single phase AC power while battery storage 802 is recharged. In operation, while phase conversion is implemented by transformer 806, the PV energy, at the same time, is also stored in batteries 802.

A Scott-T transformer which is also referred to as a Scott connection is capable of deriving three-phase electric power (120-degree phase rotation) from a two-phase (90-degree phase rotation) source. A benefit of using a transformer such as transformer 806 is to evenly distribute a balanced load between phases. Note that transformer(s) other than Scott-T transformer may be used in PV system to generate three-phase AC power output based on two-phase AC power.

In one embodiment, I-branch 808 and Q-branch 810 contain contacts 812-818, respectively. While contact 812 is coupled to terminal 822 of transformer 806 for passing PV 2-phase Q brand, contact 814 is coupled to terminal 824 of transformer 806. Contact 816 is connected to terminal 826 of transformer 806 and contract 818 is coupled to terminal 828 of transformer 806. Upon receiving 2-phase AC power inputs 808-810, transformer 806 is able to generate AC power with 120 Vt and one or two AC power with 240 Vt. AC powers can be used by attached appliances and/or pump back to the connected electrical grid.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 9:
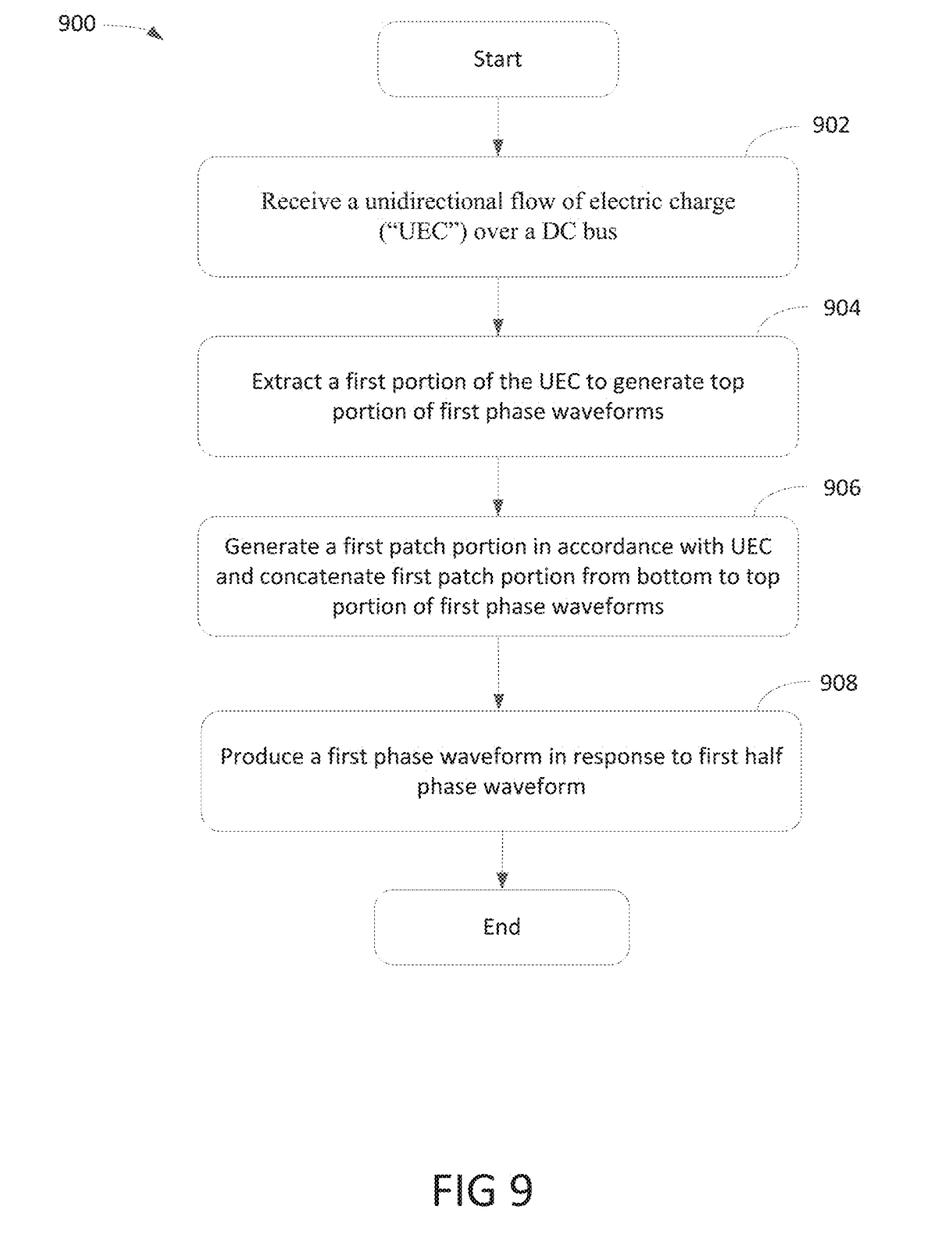
FIG. 9 is a flow diagram illustrating a DPC process for DC/AC conversion in accordance with embodiments of the present invention.

FIG. 9 is a flow diagram 900 illustrating a DPC process for DC/AC conversion in accordance with embodiments of the present invention. At block 902, a process capable of generating multi-phase AC power supply based on DC power receives a unidirectional flow of electric charge ("UEC") over a DC bus wherein the DC bus is coupled between a first switching bridge and a DC power source. DC power, in one example, is generated by a cluster of solar panels coupled to a Vbus.

At block 904, the process extracts a first portion of the UEC via a circuitry of switching bridge to generate top portion of first phase waveforms. The switching bridge, in one embodiment, contains microprocessor and memory and is able to recognize relevant waveforms from the received waveform and subsequently generate new waveform passing onto the phase generator.

At block 906, the patch component is able to generate a first patch portion in accordance with the first portion of the UEC or DC output and a second patch portion in accordance with the second portion of the UEC. The patch waveform, in one example, can be used to patch missing waveforms for the voltage waveform of the DC output such as the waveform having the bottom voltage at 0 Vt and the peak voltage at 250 Vt.

At block 908, the process is capable of producing a first phase waveform in response to the first half phase waveform and first patch portion. In one embodiment, the first patch portion is concatenated to the bottom portion of first phase waveform to form first half sing waveform. In one embodiment, every other first half phase waveform is inverted to generate full cycles of first phase waveform. A second phase waveform is produced in response to the second half phase waveform. In one aspect, a third phase waveform can also be generated in response to the first phase waveform and the second phase waveform via a Scott transformer. The power may be stored at an attached battery in response to the first, second, and third phase waveforms.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A converter configured to generate multi-phase power supply based on direct current ("DC") power, comprising:
    a first switching bridge capable of receiving DC output from a DC bus and configured to extract a first portion of DC output in accordance with a first phase of DC waveform;
    a second switching bridge coupled to the first switching bridge and configured to extract a second portion of DC output from the DC bus in accordance with a second phase of DC waveform;
    a patch component coupled to the first switching bridge and configured to generate a first patch waveform and a second patch waveform in response to a third portion of DC output from the DC bus;
    a first phase generator coupled to the first switching bridge and configured to generate a first phase AC waveform based on the first portion of DC output and a first patch waveform wherein the first phase waveform includes inverting every other first half phase waveform for generating a full cycle of the first phase waveform;
    a second phase generator coupled to the first phase generator and configured to extract a second portion of the DC output to generate a second phase waveforms, wherein the second patch waveform is concatenated to at least a portion of second phase waveforms; and a Scott transformer coupled to the second phase generator and configured to generate a third phase waveform in response to the first phase waveform and the second phase waveform.

2. The convert of claim 1, wherein the second phase generator coupled to the second switching bridge and configured to generate a second phase AC waveform based on the second portion of the DC output from the DC bus and a second patch waveform.

3. The convert of claim 2, wherein the patch component is further configured to generate a second patch waveform in response to the third portion of DC output.

4. The converter of claim 2, further comprising a transformer coupled to the first phase generator and configured to generate a third phase AC waveform in accordance with the first phase AC waveform and the second phase AC waveform.

5. The converter of claim 4, further comprising a battery coupled to output of the transformer and configured to store power transmitted from the transformer.

6. The converter of claim 1, further comprising a plurality of solar panels connected in parallel and configured to couple to the DC bus for providing a unidirectional flow of electric charge.

7. The converter of claim 1, further comprising a plurality of solar panels connected in serial and configured to couple to the DC bus for providing a unidirectional flow of electric charge.

8. The converter of claim 1, wherein the first switching bridge includes a diode bridge and a first waveform controller.

9. The converter of claim 1, wherein the first phase generator includes a four-diode bridge circuit and a first phase controller.

10. A method for generating multi-phase power supply based on direct current ("DC") power, comprising:
    receiving a unidirectional flow of electric charge ("UEC") over a DC bus coupled between a first switching bridge and a DC power source;
    extracting a first portion of the UEC to generate a plurality of top portion of first phase waveforms;
    generating, by a patch component, a first patch portion in accordance with the first portion of the UEC and capable of concatenating the first patch portion from bottom to the plurality of top portion of first phase waveforms to form first half phase waveform;
    producing a first phase waveform in response to the first half phase waveform wherein producing the first phase waveform includes inverting every other first half phase waveform to generate full cycle of the first phase waveform;
    extracting a second portion of the UEC to generate a plurality of top portion of second phase waveforms and generating a second patch portion in accordance with the second portion of the UEC and capable of concatenating the second patch portion from bottom to the plurality of top portion of second phase waveforms to form first half phase waveform;
    producing a second phase waveform in response to the second half phase waveform; and
    generating a third phase waveform in response to the first phase waveform and the second phase waveform via a Scott transformer.

11. The method of claim 10, further comprising storing power at an attached battery in response to the first, second, and third phase waveforms.

12. The method of claim 10, further comprising generating the DC power via a plurality of solar panels connected in parallel.

13. The method of claim 10, further comprising generating the DC power via a plurality of solar panels connected in serial.

14. A method for generating multi-phase power supply based on direct current ("DC") power, comprising:
    receiving a unidirectional flow of electric charge ("UEC") over a DC power source;
    extracting a first portion of the UEC to generate top portions of first phase waveforms;
    generating a first patch portion in accordance with the first portion of the UEC and capable of concatenating the first patch portion from bottom to top portion of first phase waveforms to form first half phase waveform;
    producing a first phase waveform in response to the first half phase waveform, wherein producing the first phase waveform includes inverting every other first half phase waveform to generate full cycle of the first phase waveform;
    extracting a second portion of the UEC to generate top portions of second phase waveforms;
    generating a second patch portion in accordance with the second portion of the UEC and capable of concatenating the second patch portion from bottom to the top portions of second phase waveforms to form first half phase waveform;
    producing a second phase waveform in response to the second half phase waveform; and
    generating a third phase waveform in response to the first phase waveform and the second phase waveform via a Scott transformer.

15. The method of claim 14, further comprising storing power at an attached battery in response to the first, second, and third phase waveforms.

16. The method of claim 14, further comprising generating the DC power via a plurality of solar panels connected in parallel.

17. The method of claim 14, further comprising generating the DC power via a plurality of solar panels connected in serial.

* * * * *